US010731802B2

(12) United States Patent
DeHoog et al.

(10) Patent No.: US 10,731,802 B2
(45) Date of Patent: Aug. 4, 2020

(54) COMBINED SAFETY AND FLASHLIGHT

(71) Applicant: Delta Cycle Corporation, Randolph, MA (US)

(72) Inventors: Edward DeHoog, Long Beach, CA (US); Joseph Molinari, San Rafael, CA (US)

(73) Assignee: Delta Cycle Corporation, Randolph, MA (US)

( * ) Notice: Subject to any disclaimer, the term of this patent is extended or adjusted under 35 U.S.C. 154(b) by 0 days.

(21) Appl. No.: 16/445,490

(22) Filed: Jun. 19, 2019

(65) Prior Publication Data

US 2020/0003372 A1 Jan. 2, 2020

Related U.S. Application Data

(60) Provisional application No. 62/691,101, filed on Jun. 28, 2018.

(51) Int. Cl.
| | |
|---|---|
| *F21L 4/08* | (2006.01) |
| *F21V 5/00* | (2018.01) |
| *F21V 21/088* | (2006.01) |
| *F21V 21/08* | (2006.01) |
| *F21V 23/04* | (2006.01) |
| *B62J 6/00* | (2020.01) |
| *F21Y 115/10* | (2016.01) |

(52) U.S. Cl.
CPC ............... *F21L 4/085* (2013.01); *F21V 5/008* (2013.01); *F21V 21/0816* (2013.01); *F21V 21/0885* (2013.01); *F21V 23/0414* (2013.01); *B62J 6/00* (2013.01); *F21Y 2115/10* (2016.08)

(58) Field of Classification Search
CPC ......... B62J 6/00; F21L 4/085; F21V 21/0816; F21V 21/0885; F21V 23/0414; F21V 5/008; F21Y 2115/10
See application file for complete search history.

(56) References Cited

U.S. PATENT DOCUMENTS

| | | | | |
|---|---|---|---|---|
| 4,583,153 | A * | 4/1986 | Tsuyama | B62J 6/00 362/517 |
| D544,388 | S * | 6/2007 | Chisholm | D10/114.2 |
| 7,857,478 | B1 * | 12/2010 | Keller | F21V 9/083 362/103 |
| 7,922,349 | B2 * | 4/2011 | Hunnewell | A45C 15/06 362/157 |
| D746,501 | S * | 12/2015 | Chen | D26/28 |
| 9,568,171 | B1 * | 2/2017 | Grider | F21V 21/06 |
| 2008/0165550 | A1 * | 7/2008 | Carmi | B60Q 1/0483 362/549 |

(Continued)

*Primary Examiner* — Tsion Tumebo
(74) *Attorney, Agent, or Firm* — Iandiorio Teska & Coleman, LLP

(57) ABSTRACT

A combined safety and flashlight includes a frame portion and a housing rotatable with respect to the frame portion. The housing features a plug, a switch, a battery charged via the plug, and a light source powered via the battery and switched on and off via the switch. A compound lens is disposed about the light source and includes a central lens disposed above the light source and configured to collimate light from the light source and an outer lens about the central lens configured to convert light from the light source having a lambertian profile to an isotropic profile.

9 Claims, 12 Drawing Sheets

(56) References Cited

U.S. PATENT DOCUMENTS

| | | | |
|---|---|---|---|
| 2009/0268436 A1* | 10/2009 | Taiga | B62J 6/00 |
| | | | 362/158 |
| 2011/0249430 A1* | 10/2011 | Stamatatos | B60Q 1/2615 |
| | | | 362/184 |
| 2012/0275141 A1* | 11/2012 | Keith | F21L 4/00 |
| | | | 362/158 |
| 2015/0146416 A1* | 5/2015 | Watson | F21V 21/0816 |
| | | | 362/191 |
| 2016/0173746 A1* | 6/2016 | Chien | F21V 33/0052 |
| | | | 348/159 |
| 2017/0002994 A1* | 1/2017 | Fisher | F21V 17/12 |
| 2017/0211759 A1* | 7/2017 | Qiu | F21L 4/02 |
| 2018/0050751 A1* | 2/2018 | Prehn | A41D 13/01 |

* cited by examiner

US 10,731,802 B2

COMBINED SAFETY AND FLASHLIGHT

RELATED APPLICATIONS

This application claims benefit of and priority to U.S. Provisional Application Ser. No. 62/691,101 filed Jun. 28, 2018, under 35 U.S.C. §§ 119, 120, 363, 365, and 37 C.F.R. § 1.55 and § 1.78, which is incorporated herein by this reference.

FIELD OF THE INVENTION

This subject invention, in one preferred embodiment, relates to a rechargeable, miniature, LED based light.

BACKGROUND OF THE INVENTION

When biking, it is often desirable for the bike or rider to be fitted with a flashlight providing visibility for the rider. It may also be desirable for the bike or rider to be fitted with a safety light to enable other riders and drivers of motor vehicles to see the bike and/or its rider. Unfortunately, known systems are often bulky and/or do not adequately function as both a flash and safety light. Miniature personal LED lighting devices are also known (e.g., see U.S. Pat. No. 8,867,340 incorporated herein by this reference). Some, however, do not provide enough illumination to serve as a flashlight.

BRIEF SUMMARY OF THE INVENTION

Featured, in one embodiment, is a rechargeable, miniature LED based light which collimates the LED light providing visibility for the user and which converts the lambertian profile of the LED light to an isotropic profile to enable others to better see the light emitted.

Featured is a combined safety and flashlight comprising a frame portion and a housing rotatable with respect to the frame portion. The housing includes a plug, a switch, a battery charged via the plug, and a light source powered via the battery and switched on and off via the switch. A compound lens is disposed about the light source and includes a central lens disposed above the light source and configured to collimate light from the light source and an outer lens about the central lens configured to convert light from the light source having a lambertian profile to an isotropic profile.

In some embodiments, the plug and the switch are external to the housing and the battery and light source are internal to the housing. The frame portion may include a socket for the plug which may be a USB plug. The light source may include a light emitting diode optionally with a lens.

The frame portion may include a clip rearward of the housing. The combined safety and flashlight may further include a mount securable to the rear of the housing via the clip. In one version, the mount includes a rearward concave member. There may be an ear on each side of the rearward concave member and a stretchable band held in the ears.

Also featured is a combined safety and flashlight comprising a frame portion, a housing rotatable with respect to the frame portion, a charging plug associated with the housing, a switch associated with the housing, a battery charged via the plug, a light source powered via the battery and switched on and off via the switch, and a lens associated with the housing about the light source.

Preferably, the lens is a compound lens including a central lens disposed above the light source and configured to collimate light from the light source, and an outer lens about the central lens configured to convert light from the light source having a lambertian profile to an isotropic profile.

Also featured is a combined safety and flashlight comprising, a frame portion, a housing rotatable with respect to the frame portion, a charging plug associated with the housing, a switch associated with the housing, a battery charged via the plug, a light source powered via the battery and switched on and off via the switch, a lens associated with the housing about the light source, and a mount for the housing including a stretchable hand.

Also featured is a safety and flashlight comprising a housing with a light source therein, a central lens disposed above a light source and configured to collimate light from a light source, an outer lens about the central lens configured to convert light from the light source having a lambertian profile to an isotropic profile and a mount for the housing.

The subject invention, however, in other embodiments, need not achieve all these objectives and the claims hereof should not be limited to structures or methods capable of achieving these objectives.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Figure 1:
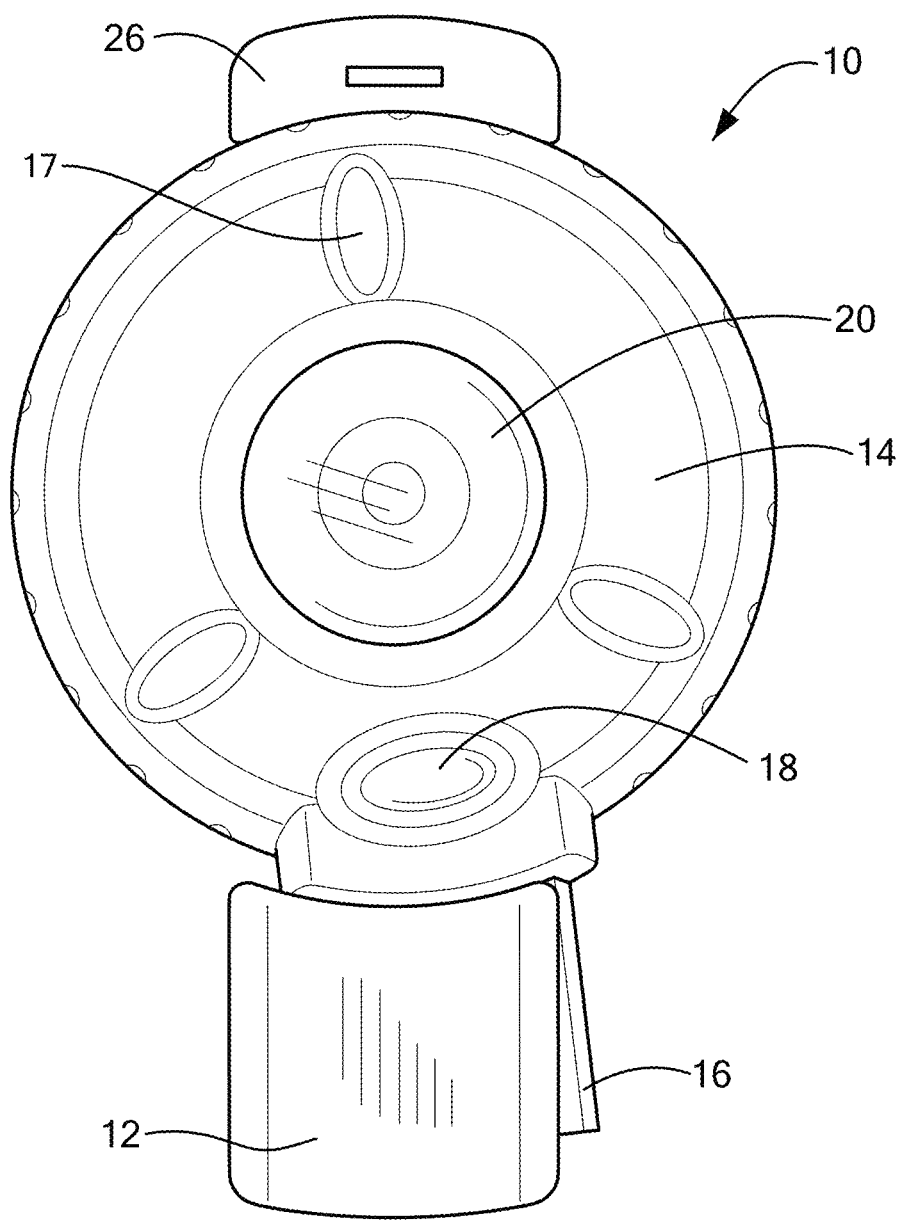
FIG. 1 is a schematic top view of an example of rechargeable, miniature, LED based light.

Aside from the preferred embodiment or embodiments disclosed below, this invention is capable of other embodiments and of being practiced or being carried out in various was. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

Figure 2:
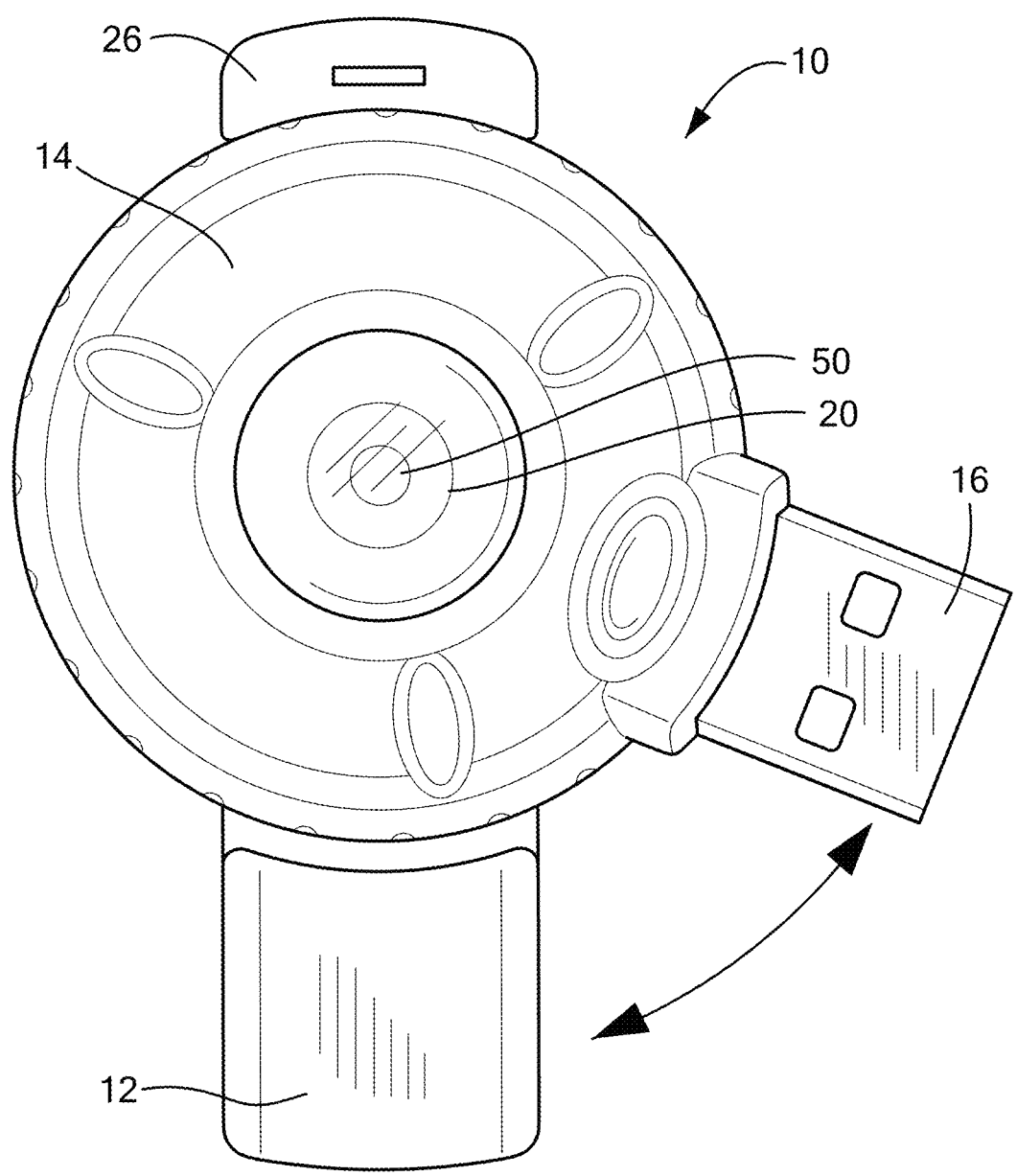
FIG. 2 is a schematic top view of the light of FIG. 1 showing how the housing rotates to withdraw the USB plug out of its protective cavity for charging the light battery.
Figure 3:
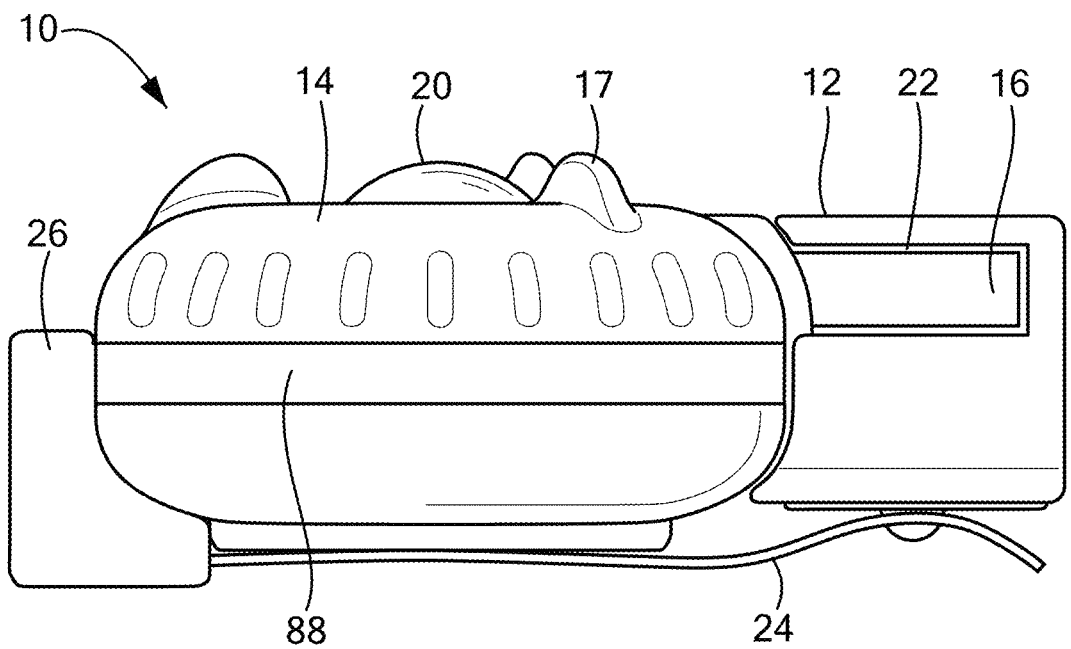
FIG. 3 is a schematic side view of the light of FIGS. 1 and 2.
Figure 4:
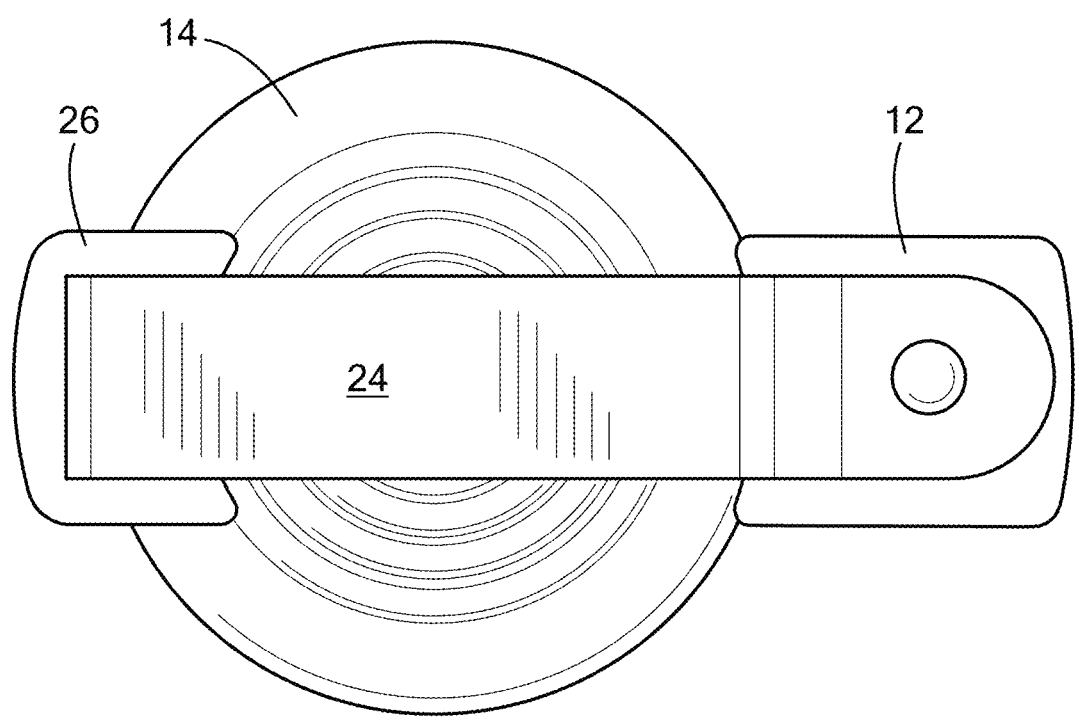
FIG. 4 is a schematic rear view of the light of FIGS. 1-3.
Figure 5:
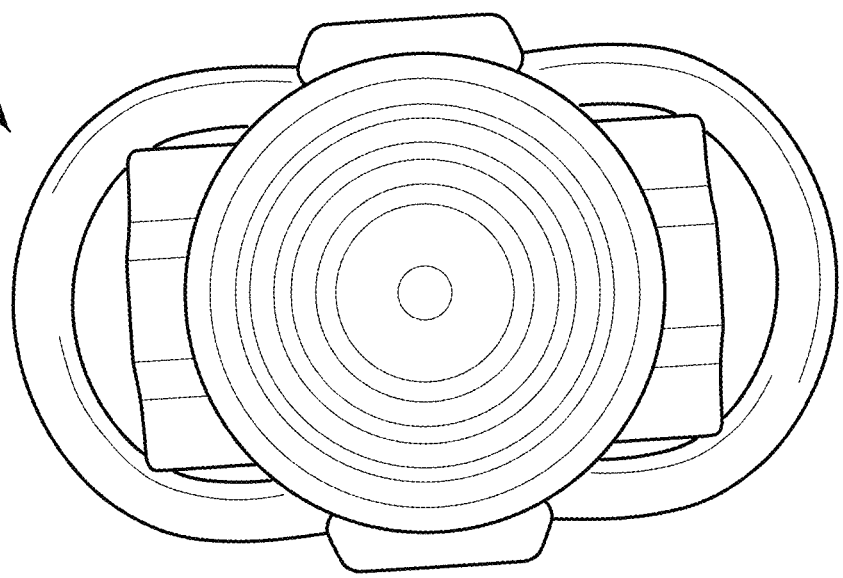
FIG. 5 is another schematic top view of the light.
Figure 6:
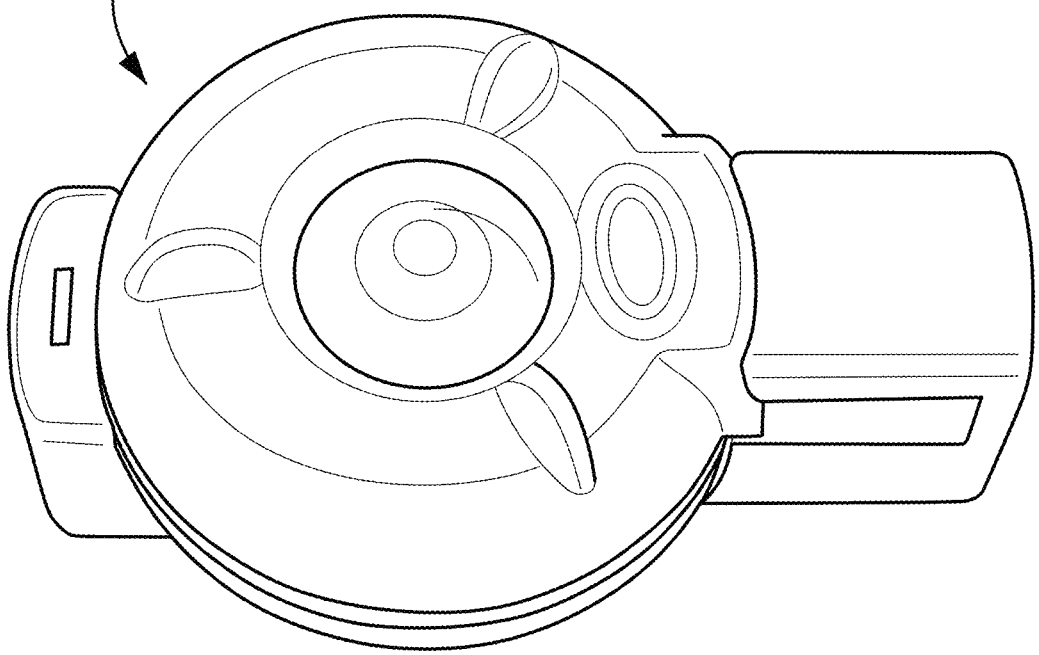
FIG. 6 is a schematic top view of an example of a mount for the light of FIG. 5.
Figure 7:
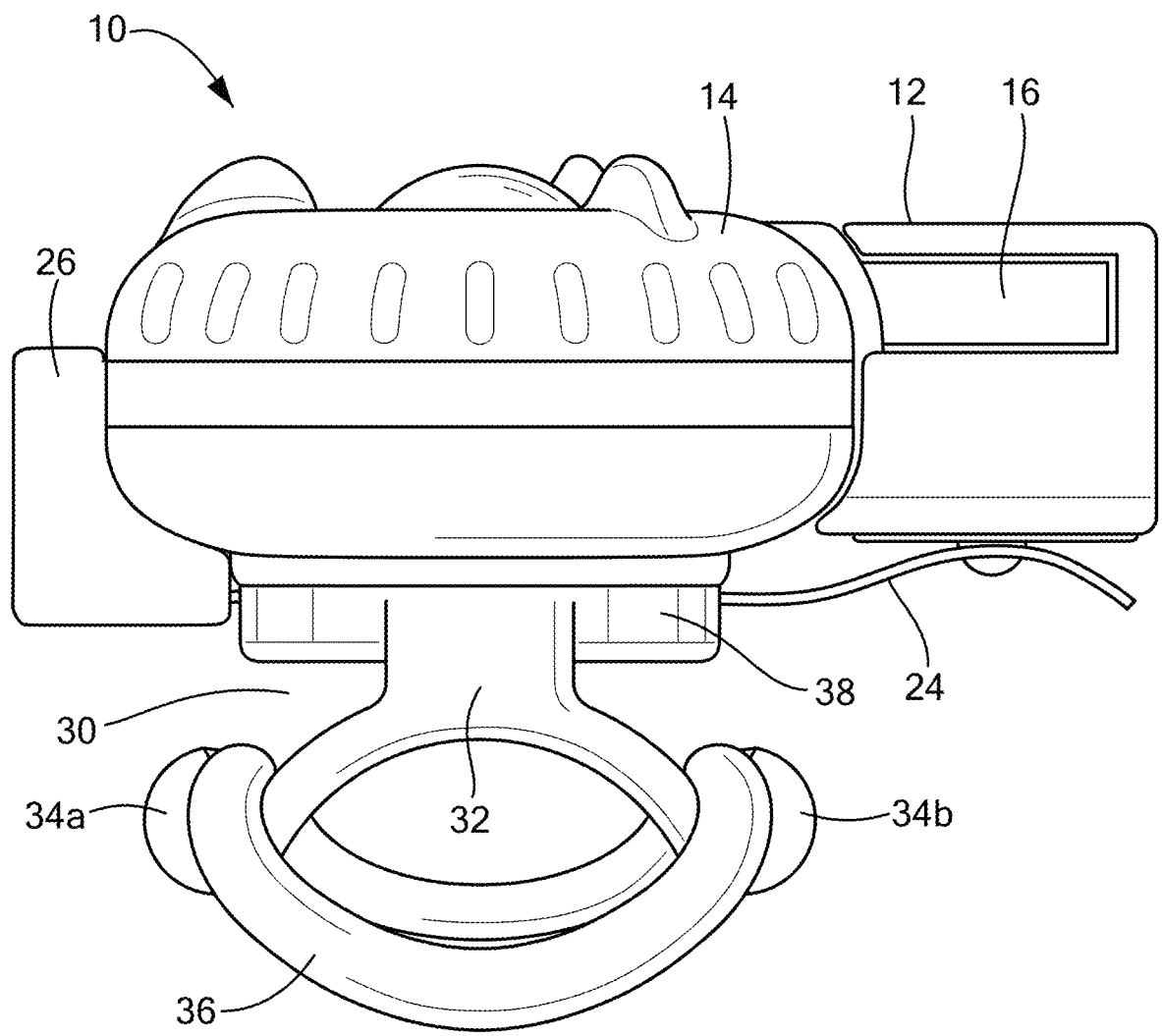
FIG. 7 is a schematic side view showing the mount attached to the light housing.
Figure 9:
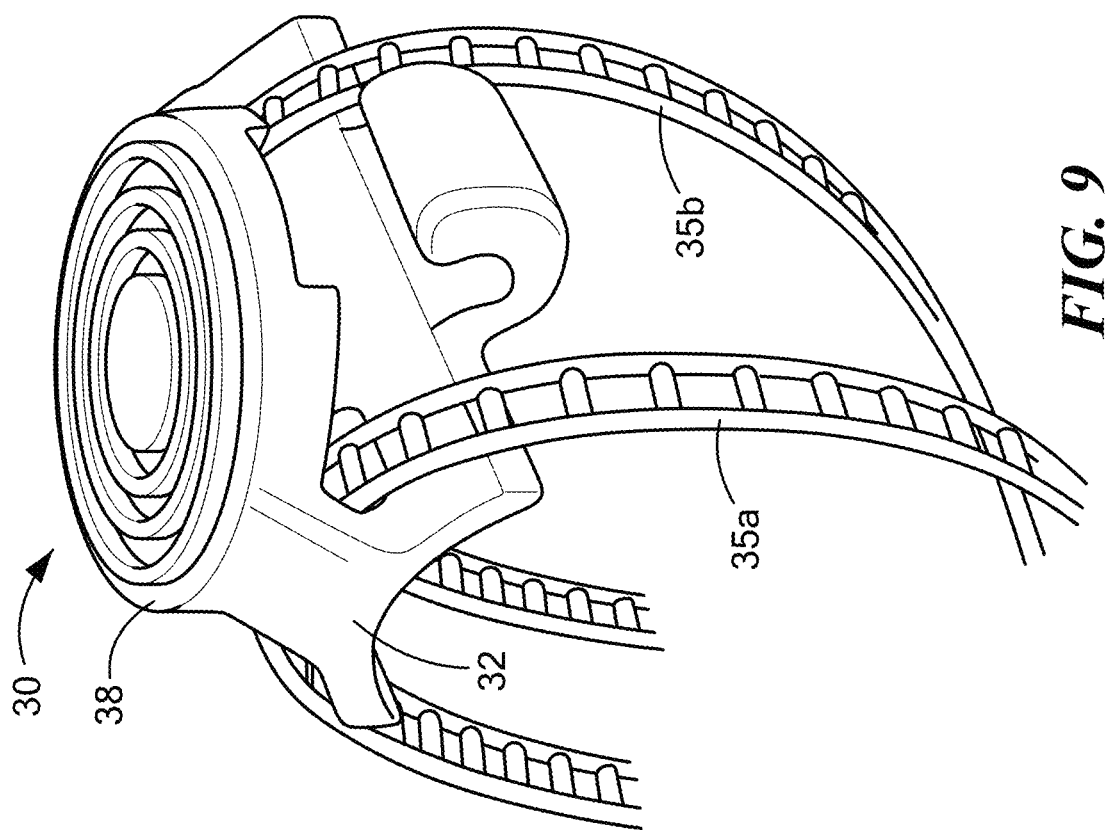
FIG. 9 is a schematic view showing the use of zip ties with the mount of FIGS. 6-7.
Figure 8:
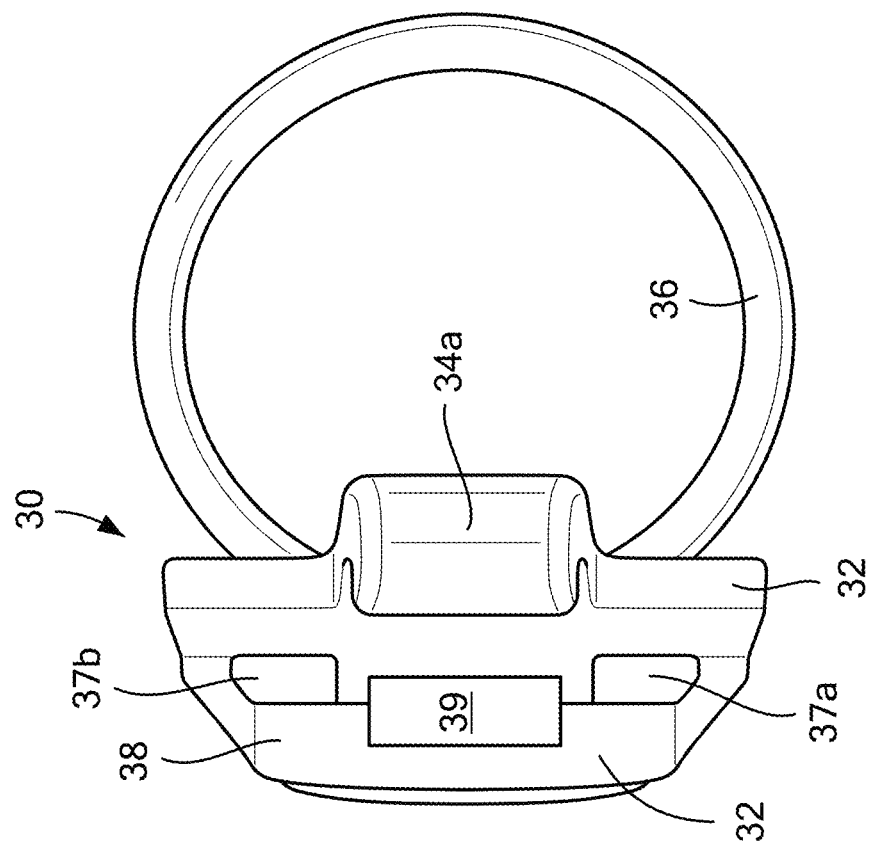
FIG. 8 is a schematic front view of the mount of FIGS. 6 and 7.

FIG. 1 shows an example of a miniature, wearable, combined safety and flashlight 10. In other embodiments, the light need not be miniature, wearable, or rechargeable. Light 10 in this specific example includes frame portion 12 and housing 14 rotatable with respect to frame portion 12. Housing 14 includes external plug 16 exposed when housing 14 is rotated as shown in FIG. 2. Housing 14 also includes external push button switch 18. Housing 14 may also include top ridges 17 for gripping. In FIGS. 1-2, lens 20 is also shown. FIG. 3 shows how frame portion 12 may include socket 22 for receiving plug 16 therein to protect the plug when not in use. Plug 16 may be a USB plug. Frame 12 may further include bottom clip 24, FIG. 4 extending from frame member 26 to frame member 12. Housing 14 rotates with respect to both frame members 12 and 26 and ring 88. Further included may be mount 30, FIG. 6 attachable to light 10. As shown in FIG. 7, mount 30 can be secured to the rear of light body 14 via clip 24. Mount 30 preferably includes rearward concave member 32 securable, for example, to a bicycle or other handlebar. Ears 34a and 34b, FIGS. 7-8, one on each side of concave member 32, support stretchable loop band 36 used to secure concave member 32 to a handlebar or other structural member. Concave member 32 is affixed to hub 38 which includes a channel 39, FIG. 8 therethrough for receiving clip 24, FIG. 7. Channels 37a and 37b through hub 38 may be used in connection with zip ties 35a and 35b, FIG. 9 in order to secure the mount 30 to a handlebar or the like.

Figure 10:
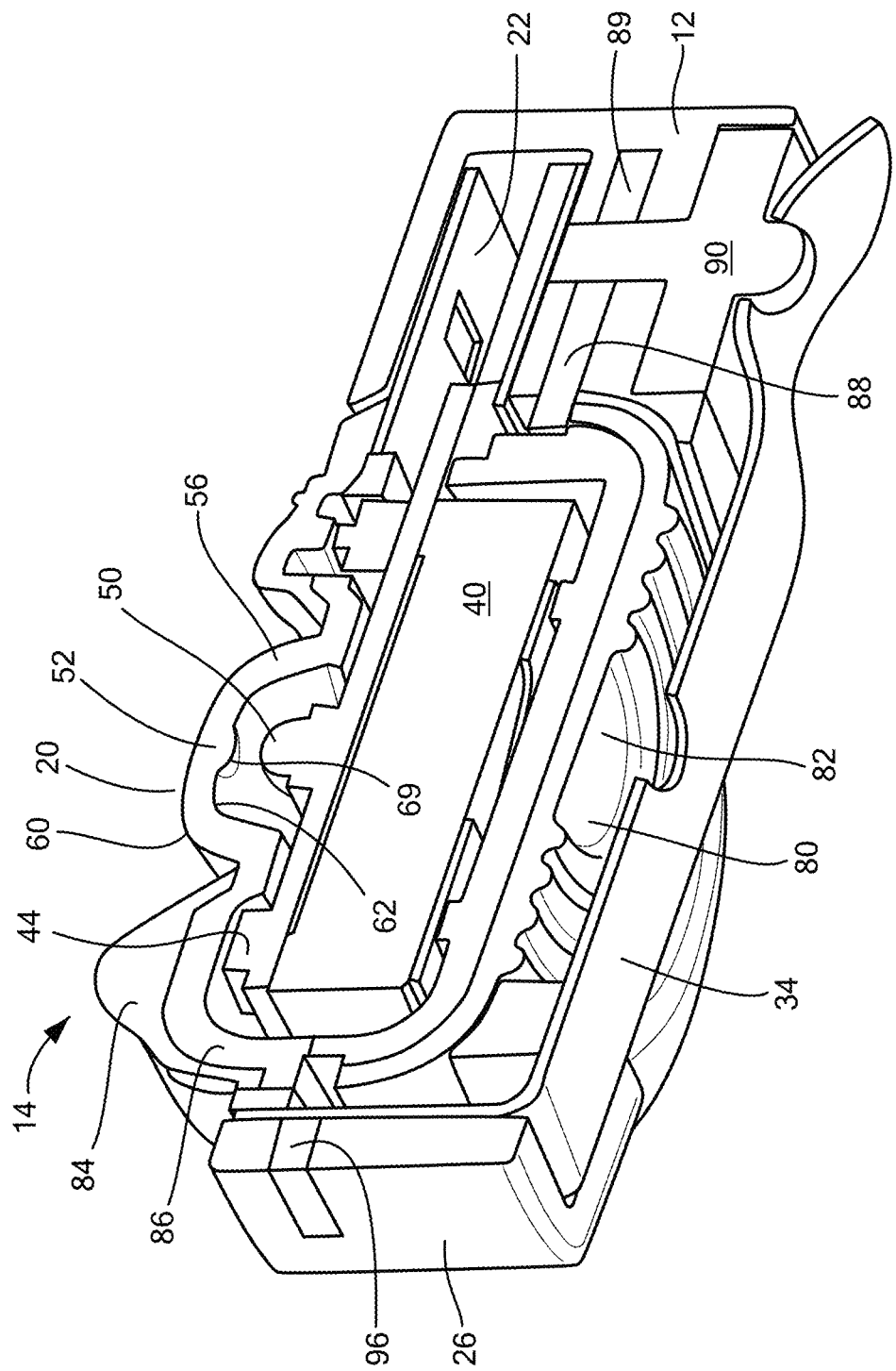
FIGS. 10-13 are views of the components of the light housing.
Figure 11:
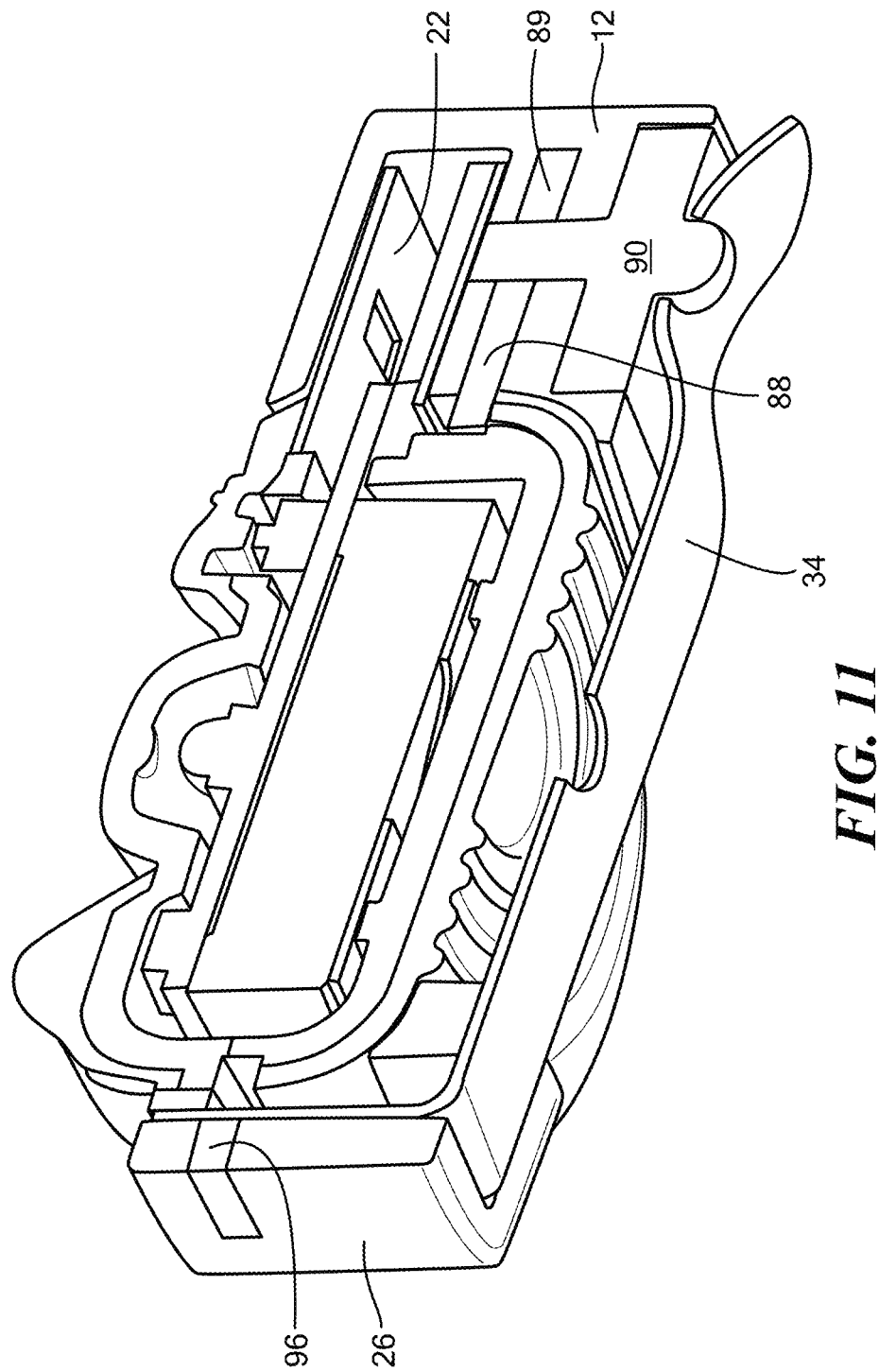
Figure 12:
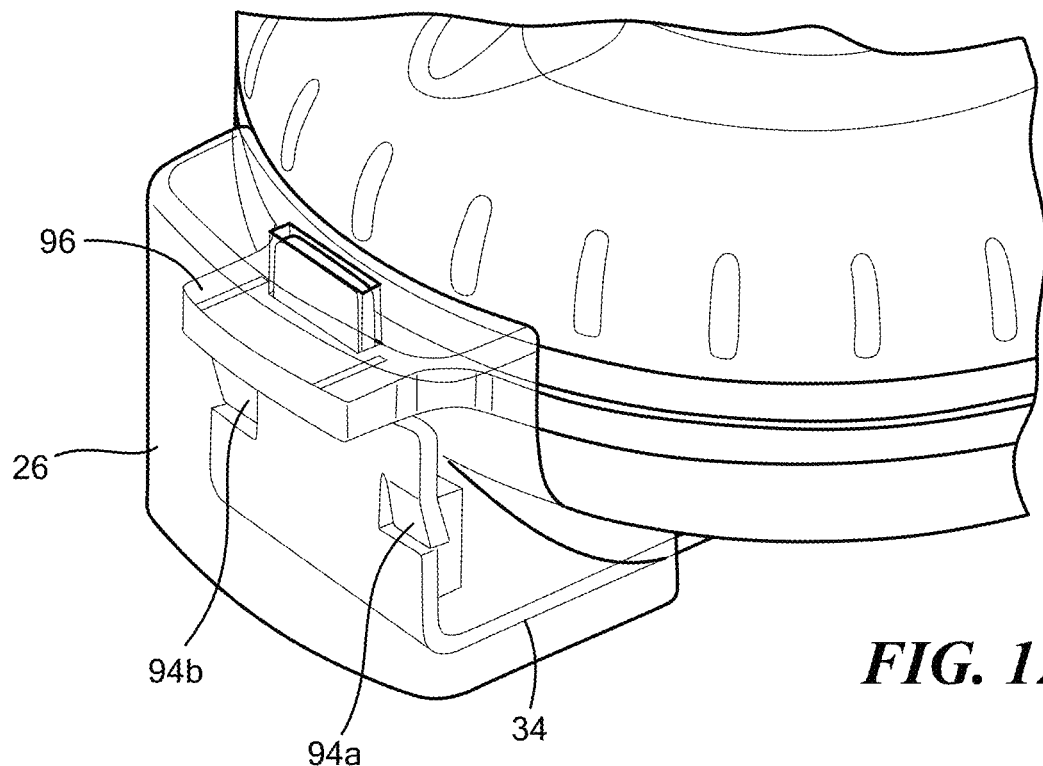
Figure 13:
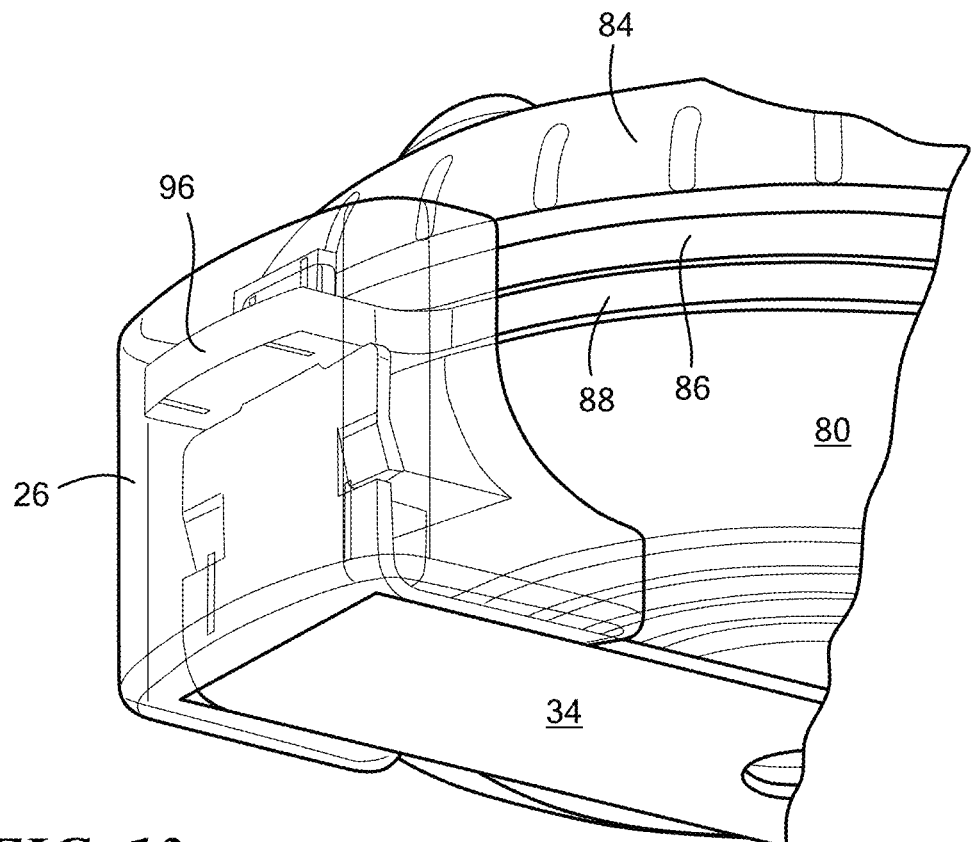

As shown in FIG. 10, housing 14 includes lower outer casing 80, lower inner casing 82, upper outer casing 84, and upper inner casing 86 which includes lens 20. Battery 40 supports circuit board 44 including the LED and its lens 50. Tang 89 of pivoting ring 88 is locked with respect to frame member 12 via elastomeric insert 90. As shown in FIGS. 11-13, frame member 26 is secured to clip 34 via barb features 94a, 94b of clip 34 which flex inward when pressed into member 26 preventing clip 34 from being removed, Another tang portion 96 of the pivoting ring 88 is received into frame portion 26. In this was, housing portion 84, 86, 82, and 80 rotate relative to frame portions 12 and 26 and ring 88 which is secured to frame portions 12 and 26.

Figure 14:
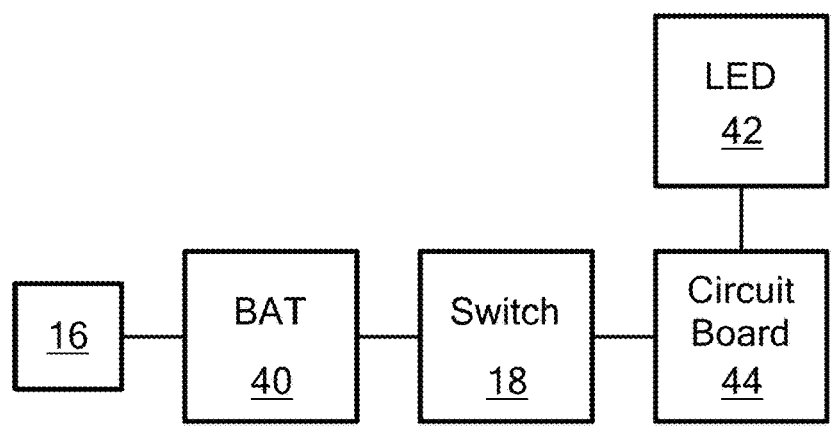
FIG. 14 is a schematic block diagram showing the primary components associated with a rechargeable, miniature, LED based light.

In this example, plug 16 may be plugged into a USB receptacle to charge battery 40, FIG. 14 which powers LED 42 mounted to or otherwise associated with circuit board 44. Switch 18 provides power to the circuit board 44 and LED 42 and may provide for multiple modes of operation depending on how many times switch 18 is pressed (e.g., strobing of the LED, flashlight mode high power, flashlight mode low power, and the like).

Figure 15:
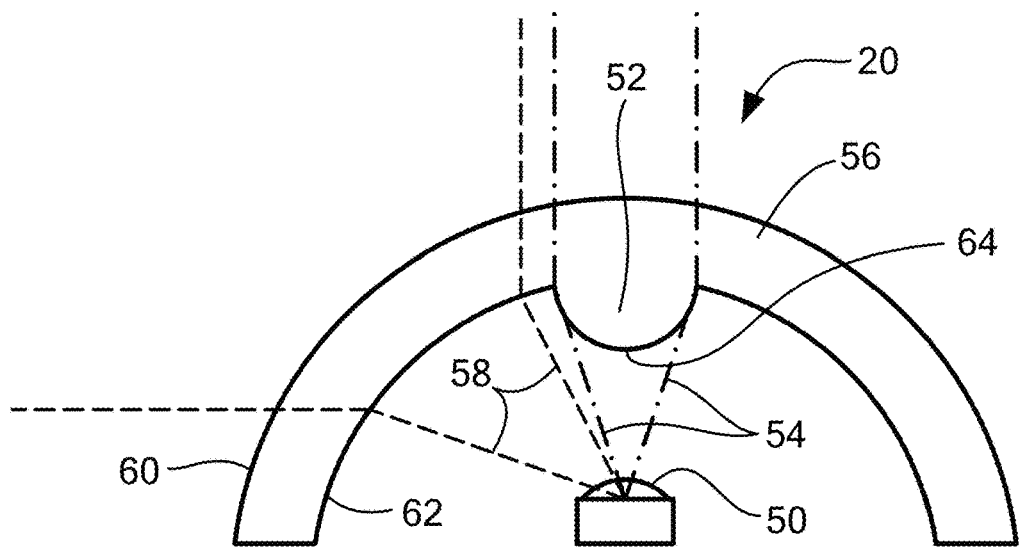
FIG. 15 is a cross sectional view of the compound lens.
Figure 16:
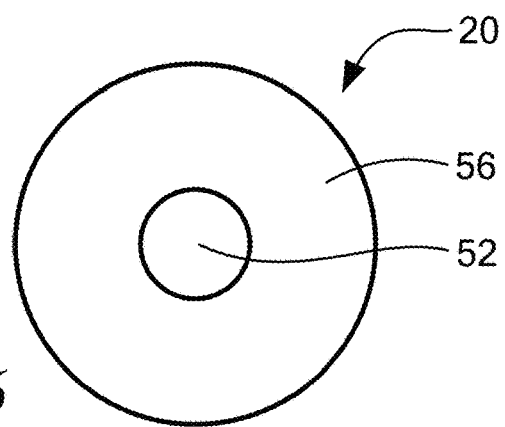
FIG. 16 is a schematic top view of the lens of FIG. 15.
Figure 17:
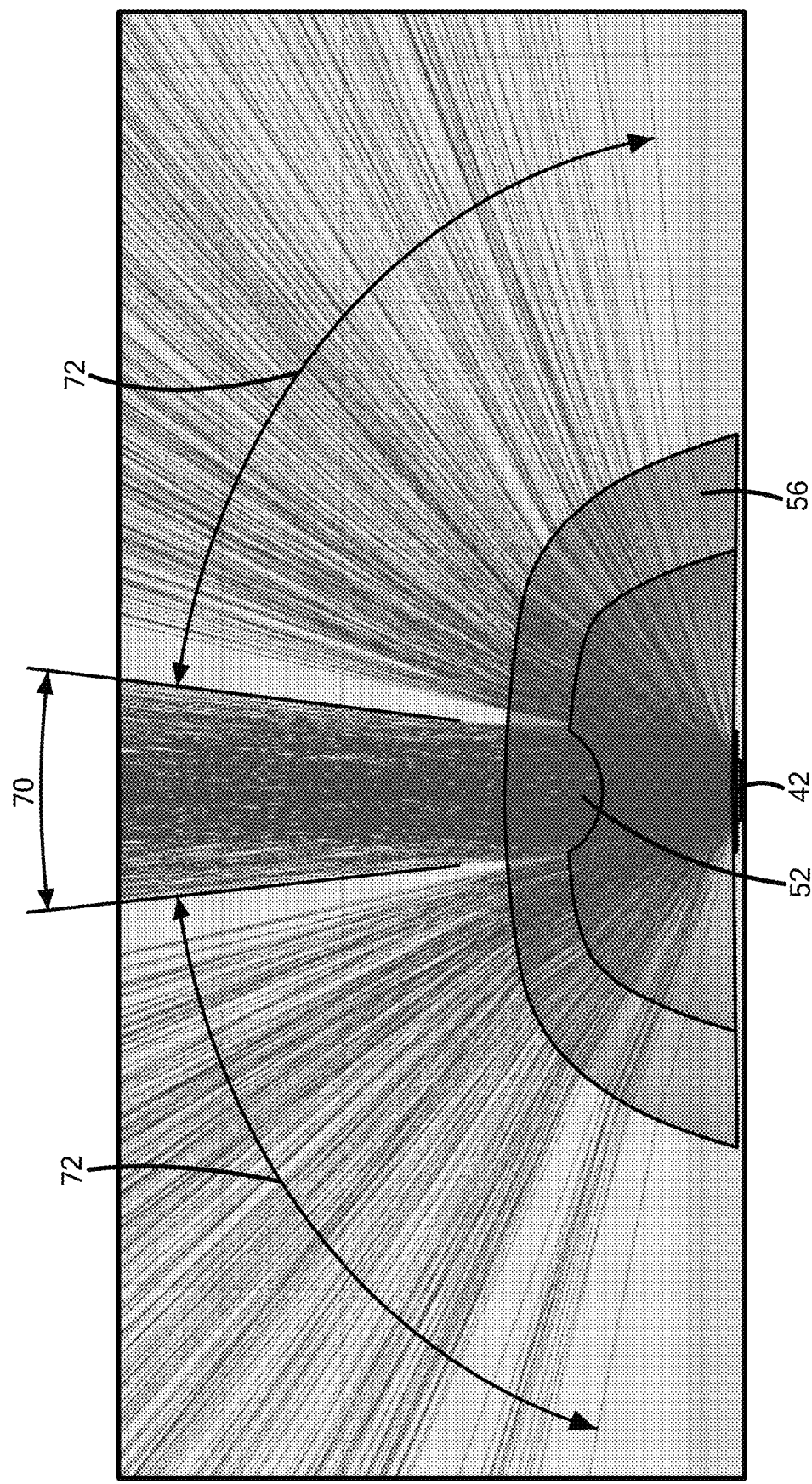
FIG. 17 is a ray trace diagram showing how the compound lens shapes the light from the LED into two zones.

Battery 40, LED 42, and circuit board 44 are all internal to the light housing. The LED 42, FIG. 14 may include a lens 50, FIG. 15. Preferably, plastic or glass lens 20 of the miniature rechargeable, combined safety and flashlight is a compound lens as shown in FIG. 15-16, Compound lens 20 is disposed about the LED lens 50 as shown and includes central lens portion 52 directly above LED lens 50 and configured to collimate or nearly collimate (e.g., small divergence) the light from the LED as shown for center rays 54. This concentrates light from the LED into a central zone with higher illumination and a narrow angle to provide visibility for the user. Outer lens 56 is disposed about central lens 52 as shown in FIG. 16 and is configured to convert light from the LED having a lambertian profile to a more isotropic profile as shown by light rays 58, FIG. 15. FIG. 17 shows a more complete ray trace. Preferably, the lens 20 includes concave outer wall 60, FIG. 15 forming a dome. Inter wall 62 of lens 20 is also in the shape of a concave dome except where central lens 52 is formed. There, inter wall 62 curves smoothly downward in the figure (or inwardly) as shown at 64. Nurbs surface modeling may be used for lens 10.

Figure 18:
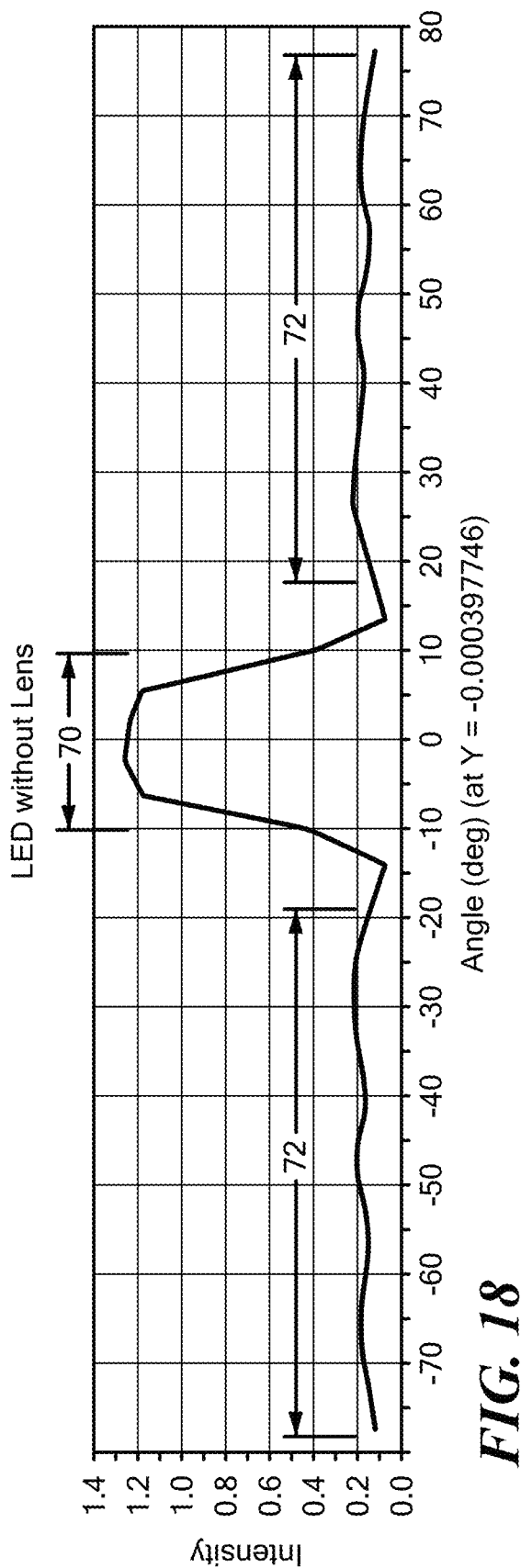
FIG. 18 is a graph of intensity versus angle for an LED without the compound lens of FIGS. 15-16.
Figure 19:
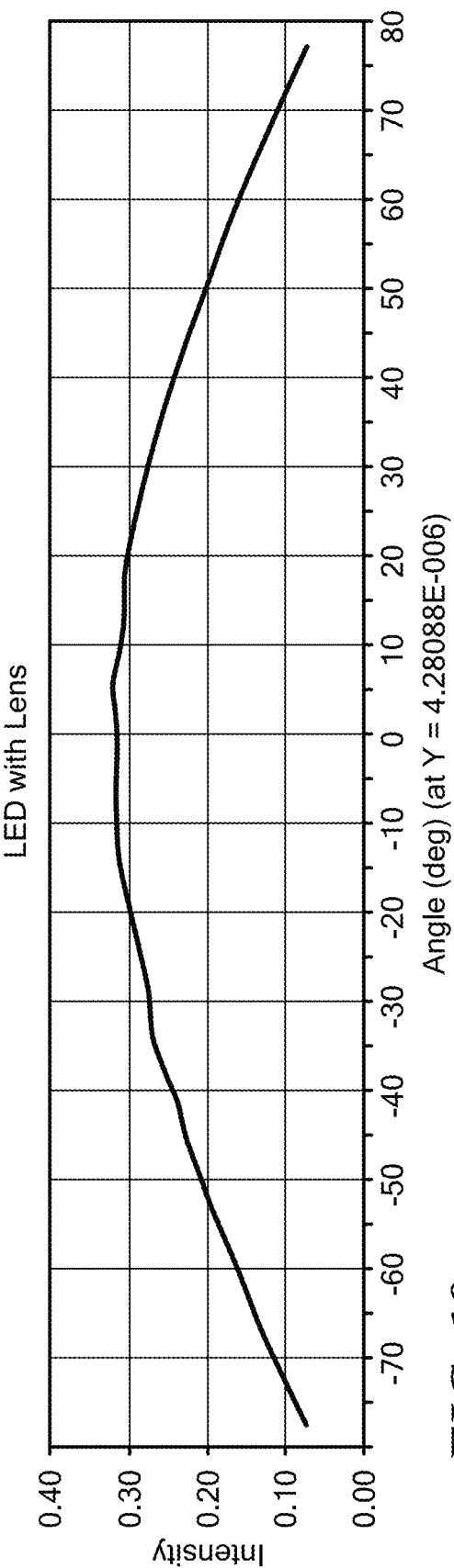
FIG. 19 is a graph showing intensity versus angle for the LED light shaped by the compound lens of FIGS. 15-16.

As shown in FIG. 18, without lens 20, FIGS. 15-16, the intensity profile of an LED is close to lambertian and its use as either a flashlight or a safety light or both is limited. But, as shown in FIG. 19, with lens 20, FIGS. 15-16 present above the LED, the central lens provides a central zone 20 with higher intensity over a narrower angle for nearly collimated light and the outer lens provides an isotropic or nearly isotropic light profile 72 where the intensity is roughly equal at every angle. As a result, light in zone 70 serves as a flashlight function enabling the user to better see her environment and light in zone 72 serves a safety light function enabling others to see the light borne by the user.

Preferably, the wearable safety light offer superior brightness in a lightweight and compact package for use day or night by users engaged in cycling, running, hiking, or walking. A 120° viewing angle is possible. The battery can be charged enabling the light to be used for up to twenty hours. In its miniature version, the light is 53 millimeters high, 34 millimeters wide, and 19 millimeters in diameter and weighs only 24 grams. The light output may be as high as 50 lumens providing a visible distance of 300 meters in the daytime and up to 1000 meters at night. The optional mount enables the light to be attached to a bike or stroller and, without the mount, the clip allows the light to be secured to a headband, article of clothing or the like.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the following claims.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

What is claimed is:

1. A combined safety and flashlight comprising:
 a frame portion including a socket;
 a housing rotatable with respect to the frame portion and including:

an external plug rotatable into and out of said frame portion socket;
a switch,
a battery charged via the plug,
a light source powered via the battery and switched on and off via the switch; and
a compound lens about the light source and including:
  a central lens disposed above the light source and configured to collimate light from the light source, and
  an outer lens about the central lens configured to convert light from the light source having a lambertian profile to an isotropic profile, the compound lens including a concave outer wall and concave inner wall with a central portion curving downwardly towards the light source to define the central lens.

2. The combined safety and flashlight of claim 1 in which the plug and the switch are external to the housing and the battery and light source are internal to the housing.

3. The combined safety and flashlight of claim 1 in which the plug is a USB plug.

4. The combined safety and flashlight of claim 1 in which the light source includes a light emitting diode.

5. The combined safety and flashlight of claim 4 further including another lens about the light emitting diode.

6. The combined safety and flashlight of claim 1 in which the frame portion includes a clip rearward of the housing.

7. The combined safety and flashlight of claim 6 further including a mount securable to the rear of the housing via the clip.

8. The combined safety and flashlight of claim 7 in which the mount includes a rearward concave member.

9. The combined safety and flashlight of claim 8 further including an ear on each side of the rearward concave member and a stretchable band held in the ears.

* * * * *